United States Patent Office 3,045,530
Patented July 24, 1962

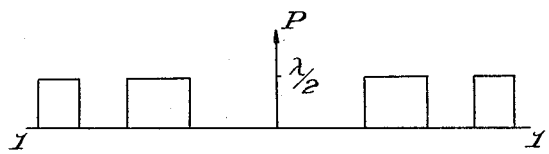
Fig-6-
Fig-7-
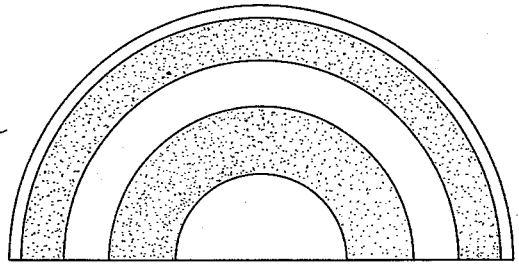
Fig-8-
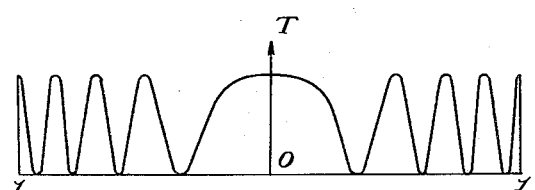
Fig-9-
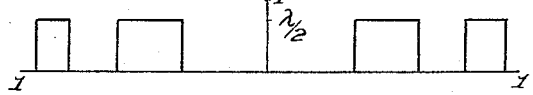
Fig-10-
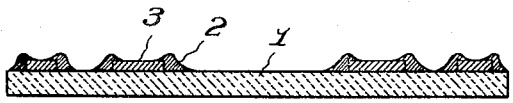
Fig-11-
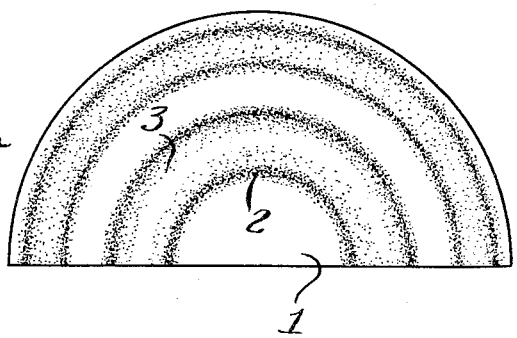
Fig-12-

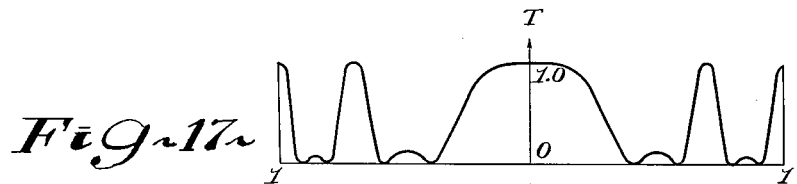
Fig. 17.
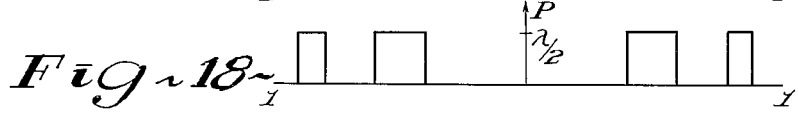
Fig. 18.
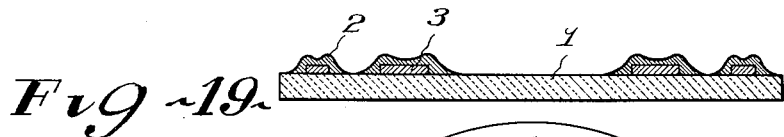
Fig. 19.
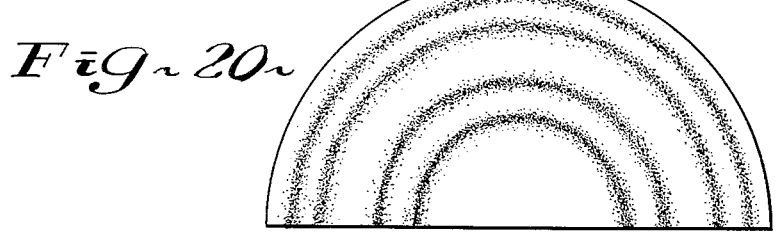
Fig. 20.
Fig. 21.
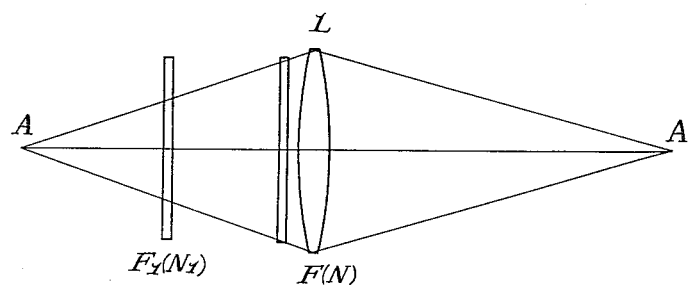

3,045,530
OPTICAL SYSTEM HAVING ABERRATION CORRECTING PLATE MEMBER WITH RING SHAPED PHASE RETARDING LAYERS
Jumpei Tsujiuchi, Tokyo-to, Japan, assignor to Agency of Industrial Science and Technology, Ministry of International Trade and Industry, Tokyo-to, Japan
Filed July 14, 1960, Ser. No. 42,949
6 Claims. (Cl. 88—14)

This is a continuation-in-part of my prior application, Ser. No. 728,187 filed April 14, 1958, and now abandoned.

The present invention relates to optics and more particularly to an improved optical-element for the compensation of aberration and to its application.

In the design of any optical instrument, every effort is made to reduce aberration as much as possible because the image is impaired by aberration. However, there are many cases, in which it is impossible to reduce the residual aberration to a practical allowable low degree owing to the various conditions necessary for manufacture of the optical instrument.

For example, in the design of an optical instrument which is to be used with ultraviolet rays, the selectable ranges of such properties as refractive index and dispersive power are narrow because of the small number of materials capable of effectively passing ultraviolet rays therethrough, whereby compensation of the aberration is made very difficult.

On the other hand, there are many cases in which, even when the design has been accurately made, the aberration of the complete optical instrument becomes considerably large due to manufacturing error. In order to avoid the above-mentioned disadvantage, it has been proposed to compensate for the aberration by constructing any suitable surface of the optical instrument as an aspherical surface or to reduce the aberration by narrowing the aperture diameters of the lens in the case of an already completed optical instrument. However, in the former case, the construction is relatively difficult, and in the latter case, the image of the optical instrument becomes remarkably dark, and the resolving power decreases.

Therefore, an essential object of the present invention is to provide an improved filter capable of correcting the aberration of any optical instrument by the mere attachment thereof to said instrument without accompaniment of the above-mentioned disadvantage. For the manufacture of any optical lens of a camera or a telescope and the like, a transparent material such as glass or quartz is usually used, so that the aperture zone of the lens is transparent. Thus, the light flux which has been transmitted through the lens has a uniform intensity distribution in the pupil of the lens. In this case, if a layer made of opaque or light-absorptive material is put on a part of the aperture zone, a variation in the intensity of the light flux will occur in the pupil in accordance with the position of the attached layer or layers, whereby an image differing somewhat from that in the case where no layer or layers is used will appear. On the other hand, when the optical thin film is put on the aperture zone of the lens in such a manner that the phase of the light flux passing through said membrane may be retarded by a half wave length relative to the phase of the other light flux which has not passed through said film, a wave aberration of half a wave length occurs on a part of the pupil apparently due to the film, whereby an image differing from that of the case in which the film is not used appears.

This invention seeks to compensate for the aforementioned deterioration of the image of the lens having an aberration by utilizing the above mentioned phenomena.

This invention can be embodied as an optical element which reduces the light flux passing through a part of the aperture zone thereof. The element is then denoted as a density element, an optical element which produces a phase retardation of a half wave length on a part of the aperture zone being denoted as a phase element. An element consisting of a combination of the above mentioned two kinds of the elements, each of said elements being used in the combined state with the main lens, may also be made.

The above mentioned new optical elements of this invention have not only an effective action for compensation of the aberration of the lens, but also a special property capable of giving two or three foci to any lens. By utilization of said latter property it is possible to make the depth of the visual field of the objective lens deep. Furthermore, the new optical element is utilized in a straightness tester which is necessary for manufacturing machines or in an alignment telescope for highly precise measurement as that obtained by a conventional complex device.

The novel features which I believe to be characteristics of my invention are set forth with particularity in the appended claims. My invention itself, however, both as to its principle and manner of operation together with further objects and advantages thereof, may best be understood by reference to the following description taken in connection with the accompanying drawings, in which:

FIG. 6 is a diagram illustrative of a phase retardation characteristic curve of a phase element according to the invention;

FIG. 7 is a sectional view of an element whose phase retardation characteristic curve is illustrated in FIG. 6;

FIG. 8 is a fragmentary plan view of the element in FIG. 6;

FIG. 9 is a diagram illustrative of a characteristic curve of a combined density and phase element according to the invention;

FIG. 10 is a phase retardation characteristic curve of a combined density and phase element according to the invention;

FIG. 11 is a sectional view of an embodiment of combination density and phase element according to the invention and having the characteristics illustrated in FIGS. 9 and 10;

FIG. 12 is a plan view of the element illustrated in FIG. 11;

FIG. 17 is a diagram of an intensity transmission curve of an element having three foci according to the invention;

FIG. 18 is a diagram illustrative of a phase retardation characteristic curve of an element having three foci according to the invention;

FIG. 19 is a sectional view of an element constructed according to the invention having the characteristics illustrated in FIGS. 17 and 18;

FIG. 20 is a fragmentary plan view of the element of FIG. 19;

FIG. 21 is a diagram for illustrating the principles of adjusting the effect of an element according to the invention in a system;

Figure 1:
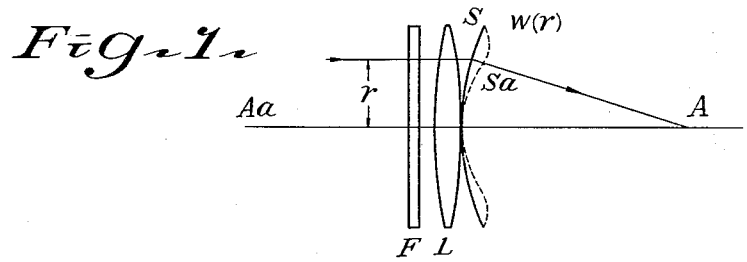
FIG. 1 is a diagram in elevational view, in longitudinal section of an optical system, for describing the principles of the present invention.
Figure 2:
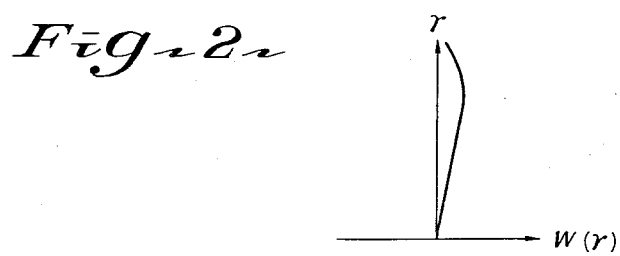
FIG. 2 is a diagram of a characteristic curve of the optical system in FIG. 1 and is illustrative of an aberration in the system.

Referring to FIG. 1, let it be assumed that the light flux transmitted through a lens L having an optical axis A—A$a$ converges to a focus A. If the lens L is an ideal lens having no aberration, the wave front of the light flux emanating out from the lens will be distributed over a spherical surface S having a center at the focus A and will converge to the point A. However, when the lens has an aberration, the light flux emanates out in the state of a wave front S$a$ displaced from the spherical surface S, whereby some parts of the light flux do not converge at the focus A, and the image is distorted. In such a case, taking in consideration a ray passing a point at a distance $r$ from the optical axis A—A$a$, the difference W($r$) between the surfaces S and S$a$ is usually denoted as the wave aberration which is ordinarily represented by the characteristic curve as shown in FIG. 2. It is assumed that the unit of W($r$) is represented by the phase angle corresponding to the difference between the wave surfaces S and S$a$.

Now, an optical element F having the same aperture as the main lens and having no convergence and divergence, and which establishes such an amplitude $t(r)$ of the light passed through a point at a distance $r$ from the center of the lens as represented by the following equation if a uniform light flux is projected on it will be considered.

$$t(r) = \frac{P + \cos[W(r) + \delta]}{1+P}$$

In the above equation, $p$ and $\delta$ are positive parameters and F takes various forms in accordance with the selection of said parameter $p$ and $\delta$.

If only the case wherein the amplitude of the curve of the wave aberration W($r$) is sufficiently large is to be considered, it will be permissible to write $\delta=0$. That is, the above equation for $t(r)$ will become:

$$t(r) = \frac{p + \cos[W(r)]}{1+p} \quad (1)$$

Generally, the image of any optical system can be calculated by Fourier transformation of the complex amplitude distribution of the light flux emanating from the exit pupil of the optical system when said distribution is known. Accordingly, the complex amplitude distribution is usually denoted as a pupil function $f(r)$ and often used for the calculation of the image of any optical system. In this case, the pupil function $f(r)$ of the lens L combined with said optical element F is represented by the following Equation 2.

$$f(r) = t(r) \exp[iW(r)]$$
$$= \frac{1}{1+p}\{p \exp iW(r) + \tfrac{1}{2} + \tfrac{1}{2} \exp i[2W(r)]\} \quad (2)$$

As will be understood, $f(r)$ is represented by the form of addition of three quantities. Accordingly, the above mentioned optical system can be regarded as the superimposition of three kinds of image which are, respectively, represented by said three additive quantities.

The first, second and third additive quantities represent, respectively, the pupil function which appears when said element is not used, that of the ideal system, and that which appears when the aberration of the optical system becomes doubled.

The parameter $p$ determines the kind of the element. The smaller said parameter is, the more the effect of compensation for the aberration becomes favourable since the first additive quantity of the Equation 2 becomes small.

In accordance with selection of the parameter $p$, the following three kinds of elements can be effectively used for embodying the above-mentioned particular optical element.

(a) Density element
(b) Phase element
(c) Combined element of said elements $a$ and $b$.

The case adopting the density element corresponds to the case in which the parameter $p$ in the equation 1 is equal to 1.

In this case, the transmission characteristics of the optical element may be preferably represented by the intensity of the light passing through the lens rather than by the amplitude. The intensity T($r$) of the light passing through the point at a distance $r$ from the center of the optical element is represented by the following Equation 3.

$$T(r) = \tfrac{1}{4}\{1 + \cos[W(r)]\}^2 \quad (3)$$

Now, let it be assumed that the optical system has a wave aberration W($r$) represented by the following Equation 4 due to the aberration caused by the defocus of the objective lens.

$$W(r) = \beta r^2 \quad (4)$$

in which $\beta$ is a constant coefficient representing the magnitude of the aberration and is usually represented by the following Equation 5 when the (one half of the relative aperture), wave length of the light and amount of the defocusing are represented, respectively, by a $\lambda$ and $\epsilon$.

$$\beta = \frac{\pi a^2}{\lambda}\epsilon \quad (5)$$

Figure 3:
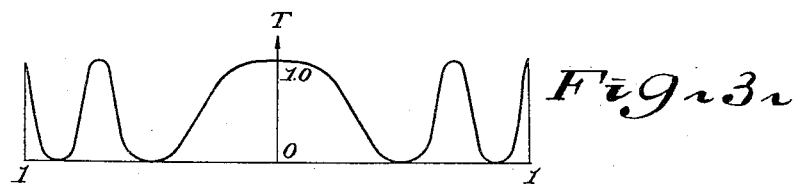
FIG. 3 is a diagram illustrative of a characteristic curve of a density element according to the invention.
Figure 4:
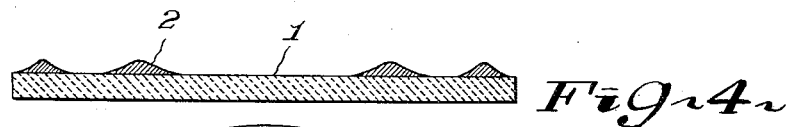
FIG. 4 is a sectional view of a density element having the characteristic curve illustrated in FIG. 3.
Figure 5:
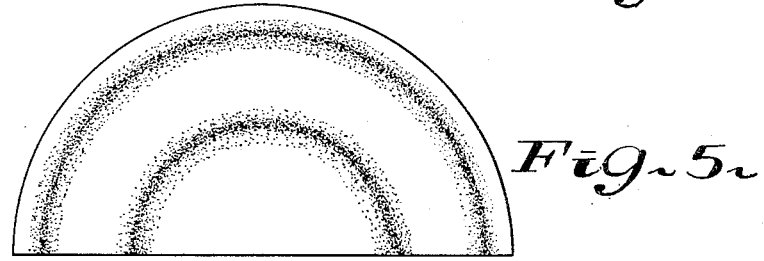
FIG. 5 is a fragmentary plan view of the density element in FIG. 4.

In FIGS. 4, 5 is shown one embodiment of a density element, in which the form of T($r$) in the case of $\beta=4\pi$ is shown by the use of the Equation 3. A characteristic diagram of this density element is illustrated in FIG. 3 in which the ordinate represents the intensity transmission T($r$), and the abscissa represents the radius of the optical element. In FIG. 4 is shown a sectional view along the diameter of an actually constructed optical element having the characteristic curve of FIG. 3. Metal ring-shaped layers 2 made of an absorptive material are bonded on circular zones of a glass plate 1 by vacuum evaporation. Each of the circles has a radius $r$ at which T($r$) becomes zero.

In FIG. 5 is shown a plan view of the plate of FIG. 4, in which two ring-shaped layers consisting of absorptive material are shown.

The case adopting the phase element corresponds to the alternation of the sign of $t(r)$ in the Equation 1 in which the parameter $p$ is made to equal zero.

When the phase retardation of the ray passed through a point at a distance $r$ from the center point of the element is represented by $p(r)$, then this phase retardation is shown by the following Equation 6.

$$P(r) = 0; \cos W(r) > 0 \quad (6)$$
$$P(r) = \lambda/2; \cos W(r) < 0$$

An example of the phase element will be described in connection with the condition ($W=\beta r^2$).

The characteristic curve of the phase element in the case of the condition ($\beta=4\pi$) is shown in FIG. 6, in which the characteristic curve illustrates the phase retardation of this element. A sectional view of this phase element is shown in FIG. 7 and a plan view of the element is shown in FIG. 8. The ring-shaped thin films 3 of transparent material are evaporated in vacuum on a glass sheet 1, corresponding to the characteristic curve of FIG. 6.

The case adopting the combined element corresponds to the case in which the parameter $p$ in the Equation 1 is made equal to zero. In this case, the density element has an intensity transmission function $T'(r)$ represented by the following Equation 7

$$T'(r) = \cos^2 [W(r)] \qquad (7)$$

$T'(r)$ and $p(r)$ in the case of the condition ($\beta=4\pi$) are shown in FIG. 9 and FIG. 10. The sectional view of an actually constructed combination element is shown in FIG. 11, in which ring-shaped transparent film layers 3 are caused to adhere to a glass plate 1 and a ring layer 2 made of absorptive material is bonded on each peripheral edge of the layers 3. FIG. 12 is a plan view of the element of FIG. 11.

Figure 13:
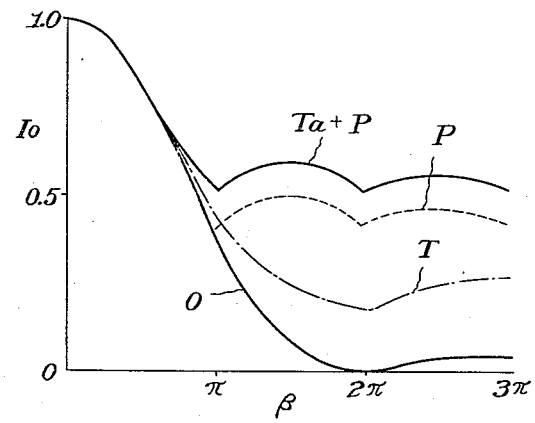
FIG. 13 is a diagram illustrative of the effect of the invention on characteristics of elements having wave aberrations.

In FIG. 13 are shown the characteristic effects of the above-mentioned elements in the case in which the wave aberration $W(r)$ is represented by the Equation 4 owing to the aberration caused by the defocus of the objective lens.

The ordinate represents the normalized Strehl's definition $I_0$ (the ratio of the brightness at the center of the image caused by an optical system having a point light source as object to the brightness at the center of the image produced when an optical system having no aberration is used, said ratio being used as an index for expressing the excellence of the image). The axis represents the value of $\beta$ defined by the Equation 5.

The characteristic curves O, T, P, and $Ta+P$ relate, respectively, to the cases in which no element is used, only the density element is used, only the phase element is used, and the combined element composed of the density element and phase element is used. The values $I_0$ of the curves T, P, and $Ta+P$ are larger than that of the curve O, whereby it will be understood that the compensation for aberration is very effective when any one of said elements is used, and that the combined element is most effective, and the phase element is intermediately effective.

Loss of the light quantity due to adoption of the above-mentioned element can be maintained at a value not larger than 50% of the loss in the case in which no element is not used. When only the phase element is used, there is no said loss.

Figure 14:
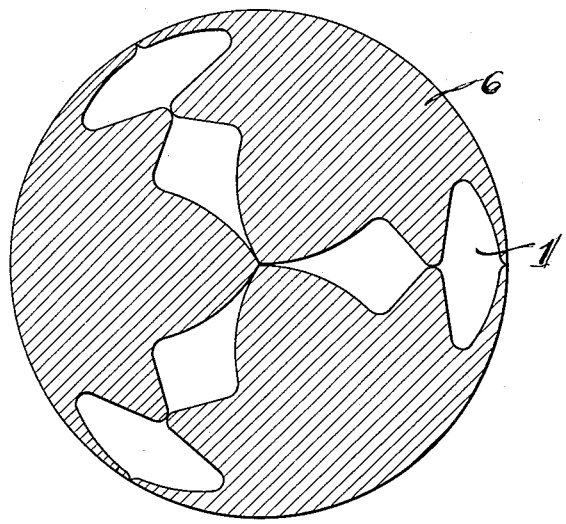
FIG. 14 is a plan view of a shield plate for depositing a density material on a glass plate to form an element according to the invention.

In the manufacture of the above mentioned optical element of this invention, first the aberration of the optical system with which the optical element of this invention is combined is determined by calculation or measurement. Then, when the density element is to be constructed, $p=1$ and the function of $W(r)$ are placed in the Equation 3. The concrete form of the element is determined by plotting such a curve as shown in FIG. 3. Next, an absorptive layer such as a metal film layer is deposited on a transparent plate such as a glass plate by vacuum evaporation, as shown in FIG. 4. This evaporation depositing can be carried out, for instance, by putting such a stencil shield plate 6 having cut portions as shown in FIG. 14 between the glass plate 1 and the metal source to be vaporized in a vacuum, then evaporating while rotating said stencil shield plate. The cut form of said stencil shield plate can be easily determined when the curve of FIG. 3 is obtained. On the other hand, ring-shaped layers may be made to adhere by any other method without using vacuum evaporation. For example, a photographic emulsion layer of high contrast consisting of gelatine of high quality is applied on a glass plate and a photograph of FIG. 5 is taken on said glass plate. As a whole, there is no large difference in the effect even when the curve of transmission of the final element differs somewhat from the value defined by the Equation 7 as long as the position of $r$ establishing the conditions ($T(r)=0, T(r)=1$) is maintained.

Figure 15:
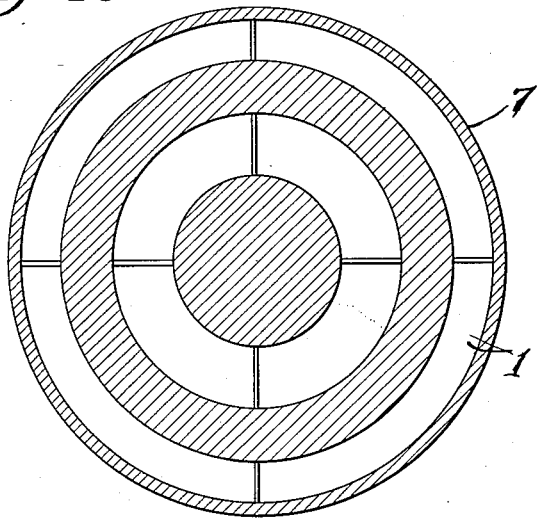
FIG. 15 is a plan view of a shield plate usable for depositing a transparent material on a glass plate to form a phase element according to the invention.

In the manufacture of a phase element, first ($p=0$, $W(r)$) is placed in the Equation 4, and the form of FIG. 6 is determined, whereby the position and number of the ring-shaped film layers are determined. In this case, the film layer is deposited on a glass plate by the vacuum evaporation of a transparent material such as magnesium fluoride. For shielding the portion which does not need to be covered by said film layer, a stencil shield plate 7 such as those shown in FIG. 15 is used. Or, on the other hand, such ring-shaped thin film layers may be obtained by removing the unwanted portions from a uniformly evaporated and deposited layer on a glass sheet. The thickness of the film layer is selected so that a phase retardation corresponding to a half wave length will occur in the light flux passing through said film layer. In the case of magnesium fluoride, optical thickness (refractivity × thickness) is about $1.8\lambda$.

In the manufacture of the combined element, first a phase element is constructed as described above and then absorptive layers are made to adhere on said element in accordance with the manufacturing method of the density element. In this case, the absorptive layers are made to adhere along the peripheral edges of the ring-shaped film layers of the phase element.

The above mentioned optical element may be prepared by placing the absorptive, transparent film or both layers directly on a suitable surface of the optical system in the same manner as in the case in which said element is constructed by a glass plate and layers adhering thereto.

The application of the element of this invention is explained in the following disclosure.

When a lens having such aberration of defocus as represented by the Equation 4 is combined with an element, the amplitude transmission function $t(r)$ thereof is represented by the following Equation 8 which corresponds to the Equation 1 in which the parameters $p$ is made equal to zero, $$t(r) = \cos \alpha r^2 \qquad (8)$$

the pupil function of said combined system becomes the value represented by the following Equation 9.

$$f(r) = \tfrac{1}{2}\{\exp [i(\beta-\alpha)r^2] + \exp [i(\beta+\alpha)r^2]\} \qquad (9)$$

In this case if $\alpha$ is sufficiently large, the image is considered as the superimposition of two images which are to be obtained by two pupil functions represented, respectively, by two additive quantities in the Equation 9.

Then, if $\beta$ is equal to $\alpha$, the first additive quantity becomes 1, whereby an ideal image will be obtained, and the image given by the second additive quantity corresponding to the defocus of $2\alpha$ is superimposed on said ideal image.

Figure 16:
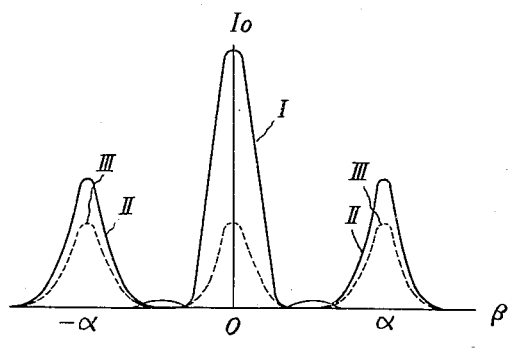
FIG. 16 is a diagram for illustrating characteristic curves of systems provided with two foci and three foci elements according to the invention.

The same condition as above is also established when $\beta$ is equal to $-\alpha$. At the focus of the optical system having no element, the factor $\beta$ is equal to zero, and the absolute value of said factor $\beta$ increases with the remoteness of the object from said focus along the optical axis. The characteristic curves for showing the variation of the normalized Strehl's definition in the above case are shown in FIG. 16, in which said definition and optical axis are, respectively, taken as ordinate and abscissa.

The curve I relates to a case in which the element is not used. Said curve I becomes a maximum ($I_0=1$) at the focus O and decreases suddenly with distance of the object from the focus O. In the curve II, relating to the case in which the element is used, the maximum value of the factor $I_0$ becomes 0.5 at both points where $\beta=-\alpha$ and $\beta=\alpha$, and becomes very small at the focus. Accordingly, an optical system having the characteristic curve II may be apparently deemed to be a system having two foci. Such an element as described above can be particularly denoted as an element of two foci. Such an optical element can be constructed when such characteristics $p(r)$ and $T'(r)$ as shown in FIGS. 6 and 9 are calculated in accordance with the above mentioned general method for constructing the phase element or combined element. In this case, it is convenient to select the condition satisfying the following equation $$\alpha = 2\pi n \qquad (10)$$

Then, the number of the ring-shaped film layers and the absorptive ring-shaped layers of the combined element become, respectively, $n$ and $2n$.

The curve III relates to the result obtained by use of the filter having an amplitude transmissibility $t(r)$ represented by the following Equation 11 which corresponds to the Equation 1 in which the parameters $p$ is selected so as to be equal to ½.

$$t(r) = \tfrac{1}{3}[1 + 2 \cos \alpha r^2] \qquad (11)$$

In this case, three foci are apparently obtained at the following positions:

$$\beta = 0 \quad \beta = -\alpha \quad \beta = \alpha$$

FIGS. 17 and 18 show, respectively, the intensity transmission curve and variation of the phase retardation necessary for manufacturing said element in the case in which $\alpha = 4\pi$. FIG. 19 is a sectional view of the actual combined element in this case, in which transparent ring-shaped layers 3 and absorptive ring-shaped layers 2 are deposited on a glass plate 1. The manufacturing method is same as in the aforementioned case. FIG. 20 is a plan view of the element of FIG. 19.

By use of the lens combined with an element having the characteristic curve II or III, two foci or three foci can be obtained. Accordingly, if said character is utilized reversely, two or three images can be formed on a same plane. Accordingly, favourable images of at least two or three positions such as remote, near and intermediate landscapes can be seen by application of said element to the objective lens of a telescope or camera.

In these cases, since it is not necessary to contract the aperture of the lens, the image is bright, and, moreover, any desirable depth of focus can be obtained by suitable selection of the value of $\alpha$.

Furthermore, as shown in FIG. 21, the light flux emanating from a point A on the optical axis and converging to the focus $Aa$ after passing through the lens L has a conical distribution having the apex points at A and $Aa$. Accordingly, if an optical element F of this invention positioned closely near the lens L and having ring-shaped layers of $n$ number is displaced toward the point or $Aa$, for instance, to $F_1$, the effective surface area of the element F passing the light flux therethrough is reduced, and the ring-shaped layers of $n_1$ number being less than $n$ become effective. Accordingly, it is possible to make any number of the ring layers effective by changing the position of the element F. As will be understood from the Equation 10, since $n$ is proportional to $\alpha$, if the element which is constructed so as to have a sufficiently large $\alpha$ is arranged between the lens and object or between the lens and image so as to be adjustable along the optical axis, it will be possible to obtain any depth of focus by use of only one sheet of the element.

This element of two foci has an excellent property as a part which is very important for a straightness tester or alignment telescope necessary for the manufacture of machines.

Figure 22:
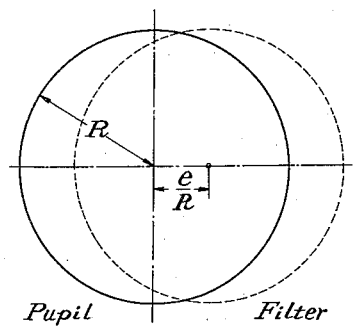
FIG. 22 is a diagram for illustrating the principles of a straightness tester and alignment telescope to which an optical element of the present invention is applied.

If the element of two foci is displaced by the distance $e$ laterally from the optical axis, as shown in FIG. 22, the pupil function in the case of the condition $(\beta = \alpha)$ will be represented by the following Equation 12, in which R represents the actual radius of the element.

$$f(r) = \tfrac{1}{2}\left[\exp i\left[2_R er - \left(\tfrac{e}{R}\right)^2\right] + \exp i\left\{2\alpha r^2 - \left[2\tfrac{\alpha}{R} er - \left(\tfrac{e}{R}\right)^2\right]\right\}\right] \qquad (12)$$

The first additive quantity in said equation is an effective factor for forming the image, and this image is an ideal image, because it contains no aberration of defocus. Said first additive quantity represents the fact that the image which is positioned on the optical axis when the element is not displaced is displaced sidewardly along the displaced direction by the distance $ea$ which is represented by the following Equation 13, in which $f$ represents focal distance of the objective.

$$ea = 2\tfrac{\lambda}{2\pi}\tfrac{\alpha}{R^2}ef \qquad (13)$$

Similarly, sideward displacement of the distance $-e$ will be obtained when $\beta$ is equal to $-\alpha$.

The above-mentioned property of the element of two foci can be applied to a straightness tester or alignment telescope.

The straightness tester or alignment telescope is a measuring device which is used for examining the flatness of any long, worked surface or for arranging various physical parts along a straight line. These devices are indispensable for the precise operation of any machine as the standard line of said devices is usually used in the advancing path of a light ray. In the measuring operation, a test object is moved along the surface to be measured and is viewed by a telescope located so that the standard line is made to coincide with the optical axis, and the straightness is measured by the displacement from the straight line of the surface to be measured by measuring the movement of the object in the visual field of the eye piece lens. In this case, for the adjustment of the focus of the ocular lens of the telescope, it is necessary to make the eye piece lens move very precisely. Otherwise, mechanical error will occur. Accordingly, in the conventional measuring device as described above, much effort has been necessary for eliminating the mechanical error due to adjusting movement of the eye piece lens, thus causing a very complicated construction of the device. The apparatus of this invention has, as will be described hereinafter, a very simple construction and no part causing the above mentioned error.

Figure 23:
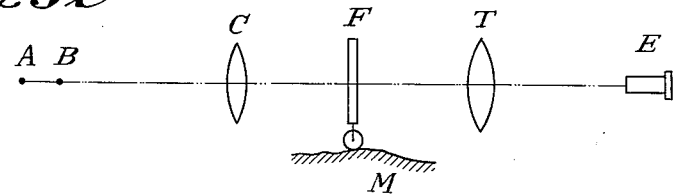
FIGS. 23, 24 and 25 are diagrams illustrative of arrangements of optical systems of straightness testers to which optical elements of the present invention are applied.
Figure 24:
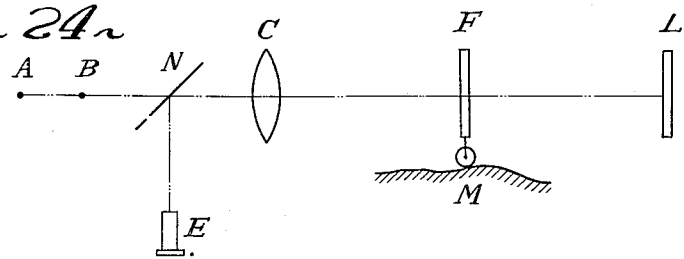
Figure 25:
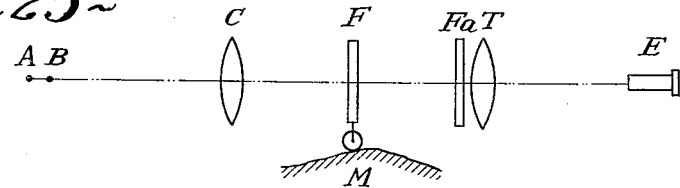
Figure 26:
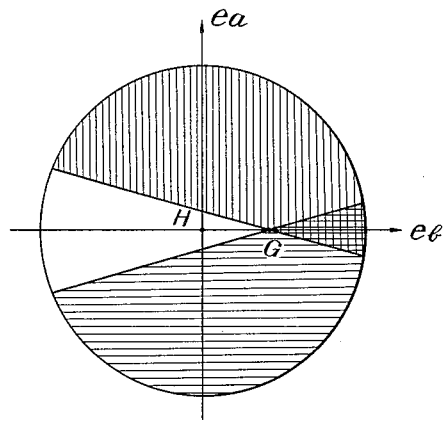
FIG. 26 is a diagram for illustrating principles for improving the sensitiveness of a straightness tester to which the present invention is applied.

FIGS. 23–25 show three kinds of arrangements of optical systems of a straightness tester. In FIG. 23, surface M to be tested is positioned between a collimator C and an observation telescope T, the targets A and B of said collimator are positioned at the defocus position to be separated, respectively, from the focus by $+\alpha$ and $-\alpha$, and an eye-piece lens E is positioned at the focus of the telescope T. If the element F of two foci moved along the surface M between the collimator C and telescope T, the images of the targets A and B which have been superimposed on the optical axis of the lens E is separated by $2ea$ by the displacement of said element moving truly along the surface M to be measured from the optical axis of the collimator C which becomes the standard line of straightness, whereby the measuring of straightness of the surface M is made possible. The arrangement shown in FIG. 23 may be modified as shown in FIG. 24, in which the surface M to be tested is positioned between the auto-collimator C and flat mirror L, and the eye-piece lens E is arranged so as to view the image through half silver mirror N. In the system in FIG. 24, the distance AB becomes twice as much as in the case in FIG. 23, so that the distance between the separated images will become $4ea$. In the embodiments in FIG. 23 and FIG. 24, when the length of the surface M becomes longer, it is necessary to carry out a slight adjustment of the focus by adjusting the eye-piece E in accordance with movement of the element F. In said adjustment, however, mechanical error caused by the adjustment of focus of the eye-piece E is not produced because the standard line of straightness in said case is determined by the line passing the centers of the targets A and B. The system in FIG. 25 relates to the case in which an element Fa having $$\frac{\alpha}{2}$$

is combined with the telescope T in the system in FIG. 23. In this system, the distance AB becomes ½ of that in the system in FIG. 23, but the distance between the separated images becomes $2ea$. According to the system in FIG. 25, adjustment of the focus of the eye-piece E by movement of the element F is not necessary unless the length of the surface is very long, whereby it becomes possible to fix all elements of the optical system except the element F at their stationary conditions. In this system, if two knife edges are used as the targets A and B and are disposed so that each of the images on the eye-piece E may be, as shown in FIG. 26, inclined by an angle $$\frac{\theta}{2}$$

to the direction perpendicular to the eccentric direction of the element F, and the relative movement of the cross point G to the original point H may be read, the transferred distance $eb$ of said movement will be represented by the following equation.

$$eb = ea \cot \theta \qquad (14)$$

Accordingly, the sensitiveness of the system can be increased by reducing the angle $\theta$.

In every case, it is necessary to illuminate the targets A and B by a monochromatic light source or a white light source combined with a color filter G.

Figure 27:
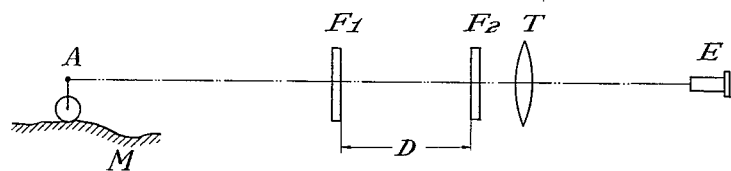
FIGS. 27 and 28 are diagrams illustrative of arrangements of optical systems of alignment telescopes to which the invention has been applied.
Figure 28:
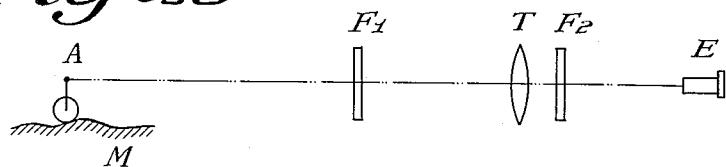

In FIGS. 27 and 28 are shown two embodiments of the optical system of an alignment telescope to which the element of this invention is applied. In FIG. 27, two elements $F_1$ and $F_2$ of two foci having the same character are arranged before the telescope T, the distance between said elements being selected as D. This embodiment relates to the system for observing the target A which moves along the surface M to be measured, in which four images are produced near the focus of the telescope T by said elements $F_1$ and $F_2$. However, when the distance AT is sufficiently longer than the distance D, and the line passing through the target A and the center of the telescope T coincides with the optical axis of the system, two images of said four images are superimposed onto each other at the same position. Now, if the target A is displaced from the optical axis so that the principal ray emitted from the target A may be projected on the element $F_1$ at an angle of $\epsilon$ relative to the optical axis, said angle $\epsilon$ causes the displacement $e$ on the surface of the elements $F_2$ in accordance with the equation $(e = D\epsilon)$, whereby images are made to be separated by $2ea$ owing to the sideward displacement toward the displaced direction of the target A. Accordingly, $\epsilon$ can be measured by measuring $2ea$ by means of the eye-piece lens E, whereby alignment of the target A on a straight line can be achieved. In this case, the optical axis, being the standard line of straightness, determined by the line connecting the centers of the elements $F_1$ and $F_2$, it is not necessary to consider the mechanical error caused by adjustment of the focus of the eye-piece E, said adjustment being carried out depending on the movement of target A. In this system, since the superimposed images are separated in the axis direction when the target A approaches the telescope, the accuracy of measurement becomes inferior. This disadvantage can be eliminated by such an arrangement as shown in FIG. 28, in which the objective lens T of a telescope is arranged between an element $F_1$ of two foci and another element $F_2$ of same character. This system is adjusted so that when the focus is made to coincide with the target A, two images may be positioned on the identical image surface by displacing somewhat the lens T in the direction of the optical axis. In this system also, since the standard axis is the line connecting the centers of the elements $F_1$ and $F_2$, the mechanical error due to the movement of the lens T is negligible.

As will be understood from the above description, the manufacture of a straightness tester or alignment telescope having very high accuracy is made possible by the use of an extremely simple optical system, said accuracy having been obtained heretofore only by the use of very complicated construction in the conventional optical system.

That is to say, the residual aberration of any optical system can be effectively corrected by the mere attachment of the optical element of this invention, and this element can be very simply manufactured. Furthermore, the optical element of this invention can be effectively applied for amplification of the depth of focus, for straightness testers, alignment telescopes, and the like.

While I have described particular embodiments of my invention, it will, of course, be understood that I do not wish my invention to be limited thereto, since many modifications may be made and I, therefore, contemplate by the appended claims to cover all such modifications as fall within the true spirit and scope of my invention.

What I claim is:

1. In an optical system, in combination, a lens and a transparent plate member disposed on the optical axis of said system in cooperation with said lens, said transparent plate member having ring-shaped light absorptive layers of at least one kind of material, said layers being thin film layers capable of producing phase retardation corresponding to half a wave length, the radius and thickness of each of said layers being such that they have an amplitude transmission function $t(r)$ represented by the equation, $$t(r) = \frac{1}{1+p}\{p + \cos(W(r))\}$$

in which $r$, $W(r)$, and $p$ represent respectively, the radial coordinate on a pupil of the optical system, wave aberration of said system, and positive parameter, and an adjusting device for axially adjusting the position of said plate member along the optical axis of said system.

2. In a straightness tester for testing, the flatness of a surface, in combination, a collimator having two targets spaced axially along the optical axis of the collimator, an observing telescope for sighting along the optical axis comprising, a transparent plate member having ring-shaped light absorptive layers of at least one kind of material, said layers being thin film layers capable of producing phase retardation corresponding to half a wave length, the radius and thickness of each of said layers being such that they have an amplitude transmission function $t(r)$ represented by the equation, $$t(r) = \frac{1}{1+p}\{p + \cos(W(r))\}$$

in which $r$, $W(r)$, and $p$ represent, respectively, the radial coordinate on a pupil of the optical system, wave aberration of said system, positive parameter, said plate member being disposed on said axis and constructed to form two images on the telescope.

3. In a straightness tester according to claim 2, said plate member comprising a second transparent plate having light absorptive characteristics corresponding to characteristics of the first mentioned plate, and the telescope comprising a lens axially spaced from said element plates.

4. In a straightness tester according to claim 3, an arrangement wherein said telescope lens is disposed between said plates.

5. In a straightness tester according to claim 2, an arrangement wherein said collimator is an autocollimator, including a mirror to reflect light rays into the viewing telescope, said plate member being disposed between said autocollimator and said mirror.

6. In a straightness tester according to claim 2, an arrangement including means to bring said two images into coincidence and means to displace one of the targets from said axis to measure the flatness and smoothness of a surface as represented by said displacement.

References Cited in the file of this patent

"Revue D'Optique," Tsujiuchi article, Vol. 37, No. 1, January 1958, pp. 1–10 cited.